(12) United States Patent
Fujimoto et al.

(10) Patent No.: US 6,255,378 B1
(45) Date of Patent: Jul. 3, 2001

(54) POLYAMIDE RESIN COMPOSITION AND PROCESS FOR PRODUCING THE SAME

(75) Inventors: Koji Fujimoto; Tsuneo Tamura; Kazushige Kojima; Sachiko Kokuryo; Izumi Yoshida, all of Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 09/403,694

(22) PCT Filed: Apr. 23, 1998

(86) PCT No.: PCT/JP98/01888

§ 371 Date: Oct. 25, 1999

§ 102(e) Date: Oct. 25, 1999

(87) PCT Pub. No.: WO98/49235

PCT Pub. Date: Nov. 5, 1998

(30) Foreign Application Priority Data

| Apr. 25, 1997 | (JP) | 9-108654 |
| May 27, 1997 | (JP) | 9-136411 |
| Sep. 17, 1997 | (JP) | 9-251728 |
| Sep. 25, 1997 | (JP) | 9-259593 |

(51) Int. Cl.[7] .................................... C08K 3/34
(52) U.S. Cl. .................... 524/449; 524/445; 524/493
(58) Field of Search .................... 524/444, 445, 524/449, 450, 451, 442; 252/378 R

(56) References Cited

U.S. PATENT DOCUMENTS

| 4,739,007 | 4/1988 | Okada et al. | 524/789 |
| 4,894,411 | 1/1990 | Okada et al. | 524/710 |
| 5,102,948 | * 4/1992 | Deguchi et al. | 524/789 |
| 5,164,440 | * 11/1992 | Deguchi et al. | 524/444 |
| 5,204,078 | 4/1993 | Tateyama et al. | 423/331 |
| 5,248,720 | 9/1993 | Deguchi et al. | 524/444 |
| 5,414,042 | 5/1995 | Yasue et al. | 524/789 |
| 5,741,601 | * 4/1998 | Kishida et al. | 428/474.4 |

FOREIGN PATENT DOCUMENTS

| 0 358 415 | 3/1990 | (EP) | C08K/3/34 |
| 940430 | * 9/1999 | (EP) . | |
| 970989 | * 1/2000 | (EP) . | |
| 63-230766 | 9/1988 | (JP) . | |
| 2-102261 | 4/1990 | (JP) . | |
| 2-149415 | 6/1990 | (JP) . | |
| 2-173160 | 7/1990 | (JP) . | |
| 3-7729 | 1/1991 | (JP) | C08G/69/04 |
| 4-124009 | 4/1992 | (JP) | C01B/25/37 |
| 6-228435 | * 5/1994 | (JP) . | |
| 6-248176 | 9/1994 | (JP) . | |
| 62-74957 | 9/1994 | (JP) . | |
| 8-3310 | 1/1996 | (JP) | C08G/69/04 |
| 8-134205 | 5/1996 | (JP) | C08G/69/04 |
| 9-012873 | * 1/1997 | (JP) . | |

* cited by examiner

Primary Examiner—Edward J. Cain
Assistant Examiner—Katarzyna Wyrozebski
(74) Attorney, Agent, or Firm—Sughrue, Mion, Zinn, Macpeak & Seas, PLLC

(57) ABSTRACT

The present invention provides a polyamide resin composition in which silicate layers originating from a layered silicate and having the below-described property ① are uniformly dispersed on a molecular level in a polyamide resin to accomplish high strength, high modulus, high heat resistance, high toughness, excellent dimensional stability, and high tensile elongation with a small deviation. ①: average particle size from a photograph observation of transmission electron microscopy is 0.1 μm or less and not including a maximum particle size of 30 μm or higher.

10 Claims, 1 Drawing Sheet

POLYAMIDE RESIN COMPOSITION AND PROCESS FOR PRODUCING THE SAME

FIELD OF THE INVENTION

This invention relates to a polyamide resin composition which provides molded articles exhibiting high strength, high modulus, high heat resistance, high toughness, excellent dimensional stability and high tensile elongation with small deviation. This invention also relates to a process for producing said polyamide resin composition.

BACKGROUND OF THE INVENTION

Polyamide resin compositions reinforced with fibrous reinforcing materials such as glass fiber and carbon fiber or inorganic fillers such as calcium carbonate are widely known. However, since these reinforcing materials have poor affinity to polyamide, the reinforced polyamide resin compositions have reduced toughness while mechanical strength and heat resistance are improved. Furthermore, molded articles of a fiber-reinforced polyamide resin composition suffer from appreciable warp. Additionally, in using the inorganic fillers, substantial improvement in mechanical strength or heat resistance cannot be obtained unless they are added in a large quantity.

In order to eliminate these disadvantages of conventional reinforced polyamide resin compositions, a composition comprising polyamide and a layered silicate typified by montmorillonite has been proposed (unexamined published Japanese patents No.62-74957, No.63-230766, No.2-102261, and No.3-7729). In this resin composition, silicate layers are uniformly dispersed in the polyamide resin on the molecular level by introducing polyamide chains into the laminae of a layered silicate. In the case of using montmorillonite for the above purpose, the montmorillonite must be swelled with organic salts (e.g., an ammonium salt of an aminocarboxylic acid, an onium salt) and then isolated, before the monomer or monomers forming the polyamide resin are polymerized.

Meanwhile, the present inventors discovered that polyamide resin compositions having a specific layered silicate (swellable fluoromica mineral) uniformly dispersed therein on the molecular level and exhibiting excellent mechanical strength and heat resistance can be obtained without the above-described inorganic salt treatment. This is achieved by mixing monomer(s) forming polyamide and swellable fluoromica mineral, and polymerizing the above-described monomer(s) usually under a high pressure of over 10 kg/cm$^2$ (unexamined published Japanese patent No. 6-248176).

Furthermore, the present inventors have proposed a process which comprises mixing monomer(s) forming polyamide, swellable fluoromica mineral, and an acid having pKa of 0~6 or negative (in 25° C. water), and then mixing the above-described monomer(s) (unexamined published Japanese patents No.8-3310 and No.8-134205). Because this process does not necessarily require high pressure during polymerization, polymerization usually under a pressure of about 5 kg/cm$^2$ provides a polyamide resin composition which provides molded articles exhibiting excellent mechanical strength, toughness, heat resistance, and dimensional stability, low water absorption ratio, and an improved water absorption property including no decrease of the above-described properties under the influence of water.

However, for the above-described polyamide resin composition, the tensile strength of molded articles is always insufficient and the deviation of the values is substantially large, being independent of the kind of layered silicates. Moreover, when manufacturing the above-described polyamide resin composition on an industrial scale, some problems arise from the viewpoint of productivity including observation of increased pressure at a nozzle part at the withdrawal of the polymer and consequently frequent exchange of filters.

As a result of extensive studies, the present inventors have discovered that the above problems are caused by an insufficient degree of uniform dispersion of a layered silicate into a nylon matrix on the molecular level, and at the same time by oversized particles which remain in the resin composition originating from impurities contained in a layered silicate as a raw material which did not participate in the above uniform dispersion.

This invention provides a polyamide resin composition which provides molded articles exhibiting high strength, high modulus, high heat resistance, high toughness, excellent dimensional stability, and high tensile elongation with small deviation. Also provided is a process for producing said polyamide resin composition.

SUMMARY OF THE INVENTION

The present invention solves the above-described problems by providing:

(1) A polyamide resin composition in which a layered silicate having the below-described property ① is uniformly dispersed on a molecular level.

①: average particle size from observation of transmission electron microscope is 0.1 μm or less and does not include a maximum particle size of 30 μm or higher.

(2) The polyamide resin composition according to (1) above, wherein said polyamide resin is selected from the group consisting of nylon 6, nylon 6 copolymers, nylon 11, nylon 11 copolymers, nylon 12 and nylon 12 copolymers.

(3) The polyamide resin composition according to (1) or (2) above, wherein 0.01~10 parts by weight of the layered silicate having the above-described property ① per 100 parts by weight of said polyamide resin are formulated.

(4) A process for producing the polyamide resin composition described in (3), which comprises polymerizing a monomer forming 100 parts by weight of polyamide resin after mixing with 0.1~10 parts by weight of a layered silicate of the below-described property ② having a cation exchange capacity of 50~200 meq/100 g and an acid (pKa 0~6 or negative in 25° C. water) at an amount of 3 times or less moles per the total cation exchange capacity of the above-described layered silicate, wherein the total amount of the above-described layered silicate and the total amount of the above-described acid are mixed with a fraction of the monomer corresponding to 30 wt % or less of the total amount of the above-described monomer, followed by addition of the rest of the monomer and polymerization of the monomer.

②: average particle size of 1~6 μm by laser diffraction method; not containing particles of 30 μm or larger as a maximum particle size.

(5) A process for producing the polyamide resin composition described in (3), which comprises polymerizing a monomer forming 100 parts by weight of polyamide resin after mixing with 0.1~10 parts by weight of a layered silicate of the above-described property ② having a cation exchange capacity of 50~200 meq/100 g and an acid (pKa 0~6 or negative in 25° C. water) at an amount of 3 times or less moles per the total cation exchange capacity of the above-described layered silicate.

(6) A process for producing the polyamide resin composition described in (3), which comprises polymerizing a monomer forming 100 parts by weight of polyamide resin after mixing with 0.1~10 parts by weight of an organically treated layered silicate which is obtained by a process comprising (i) mixing a layered silicate of the above-described property ② having a cation exchange capacity of 50~200 meq/100 g, an acid (pKa 0~6 or negative in 25° C. water) at an amount of 3 times or less moles per the total cation exchange capacity of the above-described layered silicate, and a compound forming an organic cation by reacting with the above-described acid in the presence of water, and (ii) treating at 60° C. or higher.

DETAILED DESCRIPTION OF THE INVENTION

Figure 1:
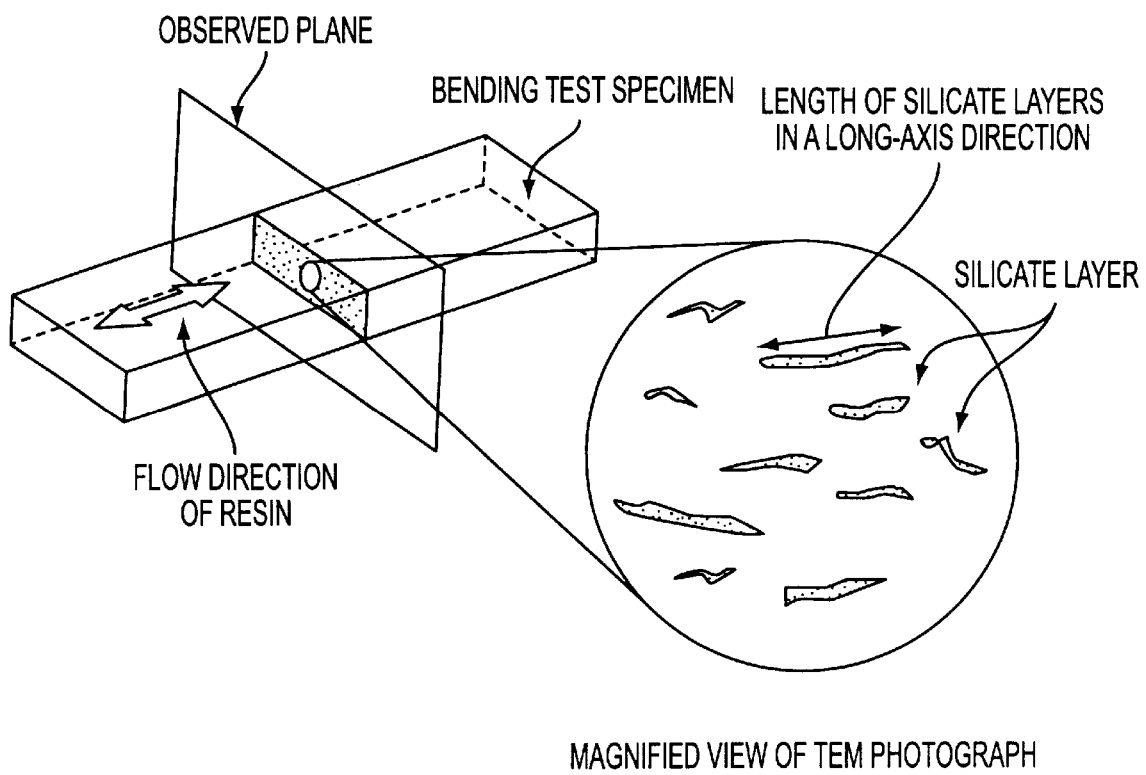
FIG. 1 explains how to measure an average particle size from photograph observation by transmission electron microscopy.

The following is a detailed description of the present invention.

The polyamide resin composition comprises polyamide having dispersed therein silicate layers on a molecular level. The language "on a molecular level" as used herein means that the layers of the layered silicate are spaced 20 Å or more from each other on average. The spacing between layers of the layered silicate is the distance between the centers of gravity of substantially every layer of a layered silicate. The language "dispersed" as used herein means that individual laminae or laminates having not more than 5 laminae, on average, of a layered silicate are present in parallel with each other and/or at random, wherein 50% or more, preferably 70% or more, of the laminae or laminates are dispersed without forming masses. More specifically, photographic observation from transmission electron microscopy (TEM) and evaluation of deviation in tensile elongation measurement can confirm such a dispersed state. In the present invention, silicate layers in the polyamide resin composition should have the above-described property ①: average particle size from observation of transmission electron microscope is 0.1 μm or less and does not include a maximum particle size of 30 μm or higher, by the method below for evaluating an average particle size and a maximum particle size. The language "not include a maximum particle size of 30 μm or higher" means that no layered silicate having an particle size of 30 μm or higher is observed in 10 photographs taken by TEM.

The polyamide resin is a polymer having an amide linkage, which is prepared from a monomer such as a lactam or an aminocarboxylic acid, or monomers such as a diamine and a dicarboxylic acid (or a nylon salt comprising a pair of them).

Examples of monomers which constitute the polyamide resin include 6-aminocaproic acid, 11-aminoundecanoic acid, 12-aminododecanoic acid and p-aminomethylbenzoic acid as an aminocarboxylic acid, and the lactam includes ε-caprolactam, ω-undecanolactam and ω-laurolactam.

Examples of the diamine include tetramethylenediamine, hexamethylenediamine, undecamethylenediamine, dodecamethylenediamine, 2,2,4-/2,4,4-trimethylhexamethylenediamine, 5-methylnonamethylenediamine, 2,4-dimethyloctamethylenediamine, m-xylylenediamine, p-xylylenediamine 1,3-bis(aminomethyl)cyclohexane, 1-amino-3-aminomethy-3,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine and aminoethypiperazine.

Examples of the dicarboxylic acid include adipic acid, suberic acid, azelaic acid, sebacic acid, decanedicarboxylic acid, terephthalic acid, isophthalic acid, naphthalenedicarboxylic acid, 2-chloroterephthalic acid, 2-methyterephthalic acid, 5-methylisophthalic acid, 5-sulfoisophthalic acid; sodium salt, hexahydroterephthalic acid, hexahydroisophthalic acid and diglycollic acid. A nylon salt comprising a pair of a diamine and a dicarboxylic acid can also be used.

Specific examples of the polyamide resin include polycaproamide (nylon 6), poly(tetramethylene adipamide) (nylon 46), poly(hexamethylene adipamide) (nylon 66), poly(hexamethylene sebacamide) (nylon 610), poly(hexamethylene dodecamide) (nylon 612), poly(undecamethylene adipamide) (nylon 116), polyundecamide (nylon 11), polydodecamide (nylon 12), poly(trimethyhexamethylene terephthalamide) (nylon TMDT), poly(hexamethylene isophthalamide) (nylon 61), poly(hexamethylene terephthal/isophthalamide) (nylon 6T/61), poly[bis(4-aminocyclohexyl)methane dodecamide], (nylon PACM12), poly[bis(3-methyl-4-aminocyclohexyl)methane dodecamide] (nylon dimethyPACM12), poly(m-xylylene adipamide), (nylon MXD6), poly(undecamethylene terephthalamide) (nylon 11 T), poly(undecamethylene hexahydroterephthalamide) [nylon 11T(H)], and a copolyamide or mixed polyamide thereof. Among these, nylon 6, nylon 46 nylon 66, nylon 11, nylon 12, and copolyamides or mixed polymers based on those nylons are preferred. Nylon 6, nylon 11, nylon 12, and copolymers based on those polyamides are especially preferred. The following are examples of nylon-6 copolymers, nylon-11 copolymers and nylon-12 copolymers.

A nylon-6 copolymer has caproamide units of 80 mole % or more, and is obtained by copolymerizing 80 mole % or more of ε-caprolactam or 6-aminocaproic acid and less than 20 mole % of other monomer(s) (lactams, aminocarboxylic acids, or nylon salts) as a comonomer. The copolymer preferably has a relative viscosity ranging from 1.5 to 5.0 as measured at a concentration of 1 g/dl in 96 wt % concentrated sulfuric acid at 25° C.

Examples of such nylon-6 copolymers include nylon 6/46 (tetramethylene adipamide) copolymer, nylon 6/66 (hexamethylene adipamide) copolymer, nylon 6/610 (hexamethylene sebacamide) copolymer, nylon 6/612 (hexamethylene dodecamide) copolymer, nylon 6/116 (undecamethylene adipamide) copolymer, nylon 6/11 (undecamide) copolymer, nylon 6/12 (dodecamide) copolymer, nylon 6/TMHT (trimethylhexamethylene terephthalamide) copolymer, nylon 6/6 1 (hexamethylene isophthalamide) copolymer, nylon 6/6T (hexamethylene terephthalamide) /6 1 (hexamethylene isophthalamide) copolymer, nylon 6/PACM12 [bis(4-aminocyclohexyl)methane dodecamide) copolymer, nylon 6/DMPACM12 [bis(3-methyl-4-aminocyclohexyl)methane dodecamide) copolymer, nylon 6/MXD6 (m-xylylene adipamide) copolymer, nylon 6/11T (undecamethylene terephthalamide) copolymer and nylon 6/11T(H) (undecamethylene hexahydroterephthalamide) copolymer. Among these copolymers, nylon 6/46 copolymer, nylon 6/66 copolymer, nylon 6/11 copolymer and nylon 6/12 copolymer are preferred. Nylon 6/66 copolymer and nylon 6/12 copolymer are especially preferred.

A nylon-11 copolymer has undecamide units of 80 mole % or more, and is obtained by copolymerizing 80 mole % or more of 11-aminoundecanoic and less than 20 mole % of other monomer(s) (lactams, aminocarboxylic acids, or nylon salts) as a comonomer. The copolymer preferably has a relative viscosity ranging from 1.5 to 5.0 as measured at a concentration of 1 g/dl in 96 wt % concentrated sulfuric acid at 25° C.

Examples of such nylon-11 copolymers include nylon 11/46 (tetramethylene adipamide) copolymer, nylon 11/66 (hexamethylene adipamide) copolymer, nylon 11/610 (hexamethylene sebacamide) copolymer, nylon 11/612 (hexamethylene dodecamide) copolymer, nylon 11/116 (undecamethylene adipamide) copolymer, nylon 11/12 (dodecamide) copolymer, nylon 11/TMHT (trimethylhexamethylene terephthalamide) copolymer, nylon 11/6 1 (hexamethylene isophthalamide) copolymer, nylon 11/6T (hexamethylene terephthalamide)/6 1 (hexamethylene isophthalamide) copolymer, nylon 11/PACM12 [bis(4-aminocyclohexyl)methane dodecamide] copolymer, nylon 11/DMPACM12 [bis(3-methyl-4-aminocyclohexyl)methane dodecamide] copolymer, nylon 11/MXD6 (m-xylylene adipamide) copolymer, nylon 11/11T (undecamethylene terephthalamide) copolymer and nylon 11/11T(H) (undecamethylene hexahydroterephthalamide) copolymer. Among these copolymers, nylon 11/46 copolymer, nylon 11/66 copolymer, nylon 11/6 copolymer and nylon 11/12 copolymer are preferred. Nylon 11/66 copolymer and nylon 11/6 copolymer are especially preferred.

A nylon-12 copolymer has dodecamide units of 80 mole % or more, and is obtained by copolymerizing 80 mole % or more of ε-laurolactam or 12-aminododecanoic acid and less than 20 mole % of other monomer(s) (lactams, aminocarboxylic acids, or nylon salts) as a comonomer. The copolymer preferably has a relative viscosity ranging from 1.5 to 5.0 as measured at a concentration of 1 g/dl in 96 wt % concentrated sulfuric acid at 25° C.

Examples of such nylon-12 copolymers include nylon 12/46 (tetramethylene adipamide) copolymer, nylon 12/66 (hexamethylene adipamide) copolymer, nylon 12/610 (hexamethylene sebacamide) copolymer, nylon 12/612 (hexamethylene dodecamide) copolymer, nylon 12/116 (undecamethylene adipamide) copolymer, nylon 12/11 (undecamide) copolymer, nylon 12/6 (caproamide) copolymer, nylon 12/TMHT (trimethylhexamethylene terephthalamide) copolymer, nylon 12/6 1 (hexamethylene isophthalamide) copolymer, nylon 12/6T (hexamethylene terephthalamide) /6 1 (hexamethylene isophthalamide) copolymer, nylon 12/PACM12 [bis(4-aminocyclohexyl) methane dodecamide] copolymer, nylon 12/DMPACM12 [bis(3-methyl-4-aminocyclohexyl)methane dodecamide] copolymer, nylon 12/MXD6 (m-xylylene adipamide) copolymer, nylon 12/11T (undecamethylene terephthalamide) copolymer and nylon 12/11T(H) (undecamethylene hexahydroterephthalamide) copolymer. Among these copolymers, nylon 12/46 copolymer, nylon 12/66 copolymer, nylon 12/11 copolymer and nylon 12/6 copolymer are preferred. Nylon 12/66 copolymer and nylon 12/6 copolymer are especially preferred.

The polyamide resin preferably has a relative viscosity ranging from 1.5 to 5.0 as measured at a concentration of 1 g/dl in 96 wt % concentrated sulfuric acid at 25° C. If it is less than 1.5, the mechanical strength in the form of molded articles decreases. If it is more than 5.0, the moldability decreases remarkably.

The layered silicate for use in the present invention has a layer structure made up of negatively charged laminae mainly comprising a silicate and alkali metal cations therebetween which are ion-exchangeable.

The layered silicate also has the above-described property ②.

The preferred cation exchange capacity of the layered silicate ranges from 50 to 200 meq/100 g as measured by the method described below. If it is less than 50 meq/100 g, exfoliation of the layered silicate may be insubstantial during polymerization. If it is more than 200 meq/100 g, the bond between layers is so firm that the layered silicate tends to be difficult to exfoliate.

Preferred examples of the layered silicate include: those from smectite group minerals (montmorillonite, beidellite, saponite, hectorite, sauconite etc); those from vermiculite group minerals (vermiculite etc); those from mica group minerals (fluoromica, muscovite, paragonite phlogopite, biotite, lepidolite, etc); those from brittle mica group minerals (margarite, clintonite, anandite, etc); and those from chlorite group minerals (donbassite, sudoite, cookeite, clinochlore, chamosite, nimite, etc).

Those layered silicates are either naturally occurring or synthetic. Swellable fluoromica mineral and montmorillonite are preferably used in this invention.

The swellable fluoromica mineral, most preferred for its whiteness, is represented by the following formula, and is readily synthesized.

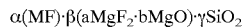

(wherein M represents sodium or lithium; α, β, γ, a, and b each represents a coefficient satisfying $0.1 \leq a \leq 2$, $2 \leq \beta \leq 3.5$, $3 \leq \gamma \leq 4$, $0 \leq a \leq 1$, $0 \leq b \leq 1$, and $a+b=1$).

Such swellable fluoromica mineral can be synthesized by, for example, a so-called melting method which comprises completely melting a mixture of silicon oxide, magnesium oxide and various fluorides in an electric oven or gas oven at 1400 to 1500° C., and cooling the melt to crystallize a swellable fluoromica mineral and allowing the crystals to grow.

The swellable fluoromica mineral can also be obtained by a method comprising heating a mixture of talc and alkali fluoride or alkali silicofluoride in a porcelain crucible at 700 to 1200° C. for a short time to intercalate alkali metal ion into the spacings of the talc laminae (as disclosed in unexamined published Japanese patent No.2-149415). The amount of alkali fluoride or alkali silicofluoride that is mixed with the talc is preferably in a range of from 10 to 35 wt % based on the mixture. If it is out of this range, the production yield decreases.

The production of the swellable fluoromica mineral can be confirmed by a wide-angle X-ray diffractometry analysis in which a peak corresponding to the thickness of the swellable fluoromica mineral is within 12 to 13 Å as the alkali metal ion intercalation proceeds.

The alkali metal of the alkali fluoride or the alkali silicofluoride should be sodium or lithium, which may be used singly or in combination. When used as the alkali metal, potassium fails to provide a swellable fluoromica mineral, but could be used in a limited amount in combination with sodium and/or lithium for the purpose of swelling control. The swelling can also be controlled by adding a small amount of alumina to the mixture.

In the case of the swellable fluoromica mineral obtained by the above intercalation process of the alkali metal, talc as a raw material not participating in intercalation or a needle-like crystal as by-product may exist in a swellable fluoromica mineral, usually in an amount of several percents by weight. These materials do not participate in uniform dispersion into the polyamide matrix at all, and remain as oversized particles in the polyamide resin composition. Therefore, such oversized particles should be eliminated by classification or crushing, by which process the swellable fluoromica mineral comes to satisfy the above-described property (②). In order to balance between elongation property and strength/modulus, it is preferred to use such a layered silicate that has an average particle size of 2.5~6 μm and that does not contain particles of 20 μm or more as maximum.

The above-described montmorillonite has $Na^+$ or $Ca^{2+}$ as ion-exchangeable positive charges. If it occurs naturally, the content ratio of those cations varies depending on the place of the production. It is preferred that the cation between the layers of montmorillonite is in advance replaced by $Na^+$ by ion-exchange treatment. Impurities, etc. contained in montmorillonite should be eliminated by elutriation. Moreover, the particle size of the montmorillonite is controlled, if necessary, by classification or crushing in order to meet the above-described property (②). The preferred montmorillonite is such that it has an average particle size of 1~3 μm and does not contain a maximum particle size of 10 μm or more by laser diffraction method in order to provide balance in elongation property and strength/modulus.

The amount of the layered silicate in the present polyamide resin composition is preferably 0.1~10 parts by weight, more preferably 0.5~5 parts by weight per monomer forming 100 parts by weight of polyamide resin. If the amount is less than 0.1 parts by weight, the reinforcing effect of the layered silicate to the polyamide resin matrix is insubstantial for obtaining a polyamide resin composition having excellent mechanical strength and heat resistance. If it is more than 10 parts by weight, the elongation properties of the polyamide resin composition deteriorate, and molded articles cannot be obtained with mechanical strength and heat resistance in balance.

The following are some processes for producing the present polyamide resin composition.

In a first method, the total amount of the above-described range of the layered silicate (having the above-described property ②) and the total amount of the acid are in advance added to a portion of the monomer for forming a polyamide resin and mixed, followed by addition of the rest of monomer and then the polymerization.

The amount of monomer that is in advance mixed with the total amount of the layered silicate and the acid is preferably 30 wt % or less to the total monomer forming the polyamide resin. If the amount exceeds 30 wt %, the elongation enhancement effect tends to decrease in molded articles obtained from the present polyamide resin composition. In conducting the above-described mixing of raw materials prior to polymerization, it is preferable to use an agitating tool such as a homogenizer to obtain high revolution and high shear, or to use a supersonic radiator, or to treat in an autoclave.

The acid for use in this invention satisfies pKa of 0~6 or negative (in 25° C. water). If the pKa exceeds 6, improvement in mechanical strength or heat resistance is not substantial because of reduced proton release.

Useful acids, either organic or inorganic, include benzoic acid, sebacic acid, formic acid, acetic acid, monochloroacetic acid, trichloroacetic acid, trifluoroacetic acid, nitrous acid, phosphoric acid, phosphorous acid, hydrochloric acid, hydrobromic acid, hydroiodic acid, nitric acid, sulfuric acid, perchloric acid, fluorosulfonic acid-pentafluoroantimony (1:1) (available from Aldrich under the trade name of Magic Acid®) and fluoroantimonic acid.

The addition amount of the acid is preferably 3 moles or less, more preferably, 0.5 to 2 moles, per mole of the cation exchange capacity of the layered silicate as a raw material. If the acid addition amount exceeds 3 moles per mole of the cation exchange capacity, the polymerization degree of the polyamide resin tends to be difficult to increase and also corrosion of the autoclave may occur in production in series.

The polymerization is preferably conducted at a temperature of 240 to 300° C. and a pressure of 2 to 30 kg/cm² for 1 to 15 hours.

A second method comprises mixing monomer forming a polyamide resin in the above-described range in the presence of a layered silicate satisfying the above-described property ② and an acid (pKa 0~6 or negative in 25° C. water) in an amount of 3 moles or less per the total cation exchange capacity of the above-described layered silicate, and then polymerizing the above-described monomer.

The polymerization is preferably conducted at a temperature of 240 to 300° C. and a pressure of 2 to 30 kg/cm² for 1 to 15 hours.

The addition amount of the acid is preferably 3 or less moles, more preferably, 0.5 to 2 moles, per mole of the cation exchange capacity of the above-described layered silicate. If the acid addition amount exceeds 3 moles per mole of the cation exchange capacity, it tends to be difficult to increase the polymerization degree of the polyamide resin, and also corrosion of the autoclave may occur in production in series.

A third method comprises polymerizing a monomer forming 100 parts by weight of polyamide resin after mixing with an organically treated layered silicate within the above range, which is obtained by a process comprising mixing (i)a layered silicate having the above-described property ②, an acid (pKa 0~6 or negative in 25° C. water) in an amount of 3 times or less moles per the total cation exchange capacity of the above-described layered silicate, and a compound forming an organic cation by reacting with the above-described acid in the presence of water, and (ii)treating at 60° C. or higher.

The polymerization is preferably conducted at a temperature of 240 to 300° C. and a pressure of 2 to 30 kg/cm² for 1 to 15 hours.

The organically treated layered silicate thus obtained may be under any condition of water coexistence which includes an aqueous solution and a swelled form, or under a dried condition after isolation. In conducting the above-described ion exchange treatment, it is preferable to use an agitating tool such as a homogenizer to obtain high revolution and high shear, or to use a supersonic radiator, or to treat in an autoclave. (Hereinafter, a swellable fluoromica mineral that is organically treated is referred to as an "organic fluoromica", and montmorillonite which is organically treated is referred to as "organic montmorillonite").

Organic compounds which can react with the above-described acids to form organic cations include those derived from aminocarboxylic acids represented by the following formula ③, lactams represented by the following formula ④, phosphines represented by the following formula ⑤, and sulfides represented by the following formula ⑥. Aminocarboxylic acids and lactams are preferred.

③

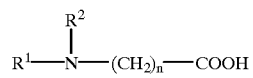

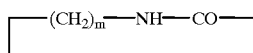

(4)

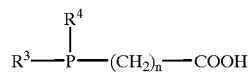

(5)

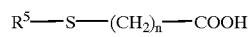

(6)

[wherein $R^1$, $R^2$, $R^3$, $R^4$, and $R^5$ are substituents selected from the group consisting of alkyl having 1 to 20 carbon atoms, carboxyl, hydroxyl, phenyl, hydrogen atom, where a hydrogen atom in the alkyl or the phenyl may be substituted by a substituent selected from the group consisting of halogen, hydroxyl, carboxyl, —COOR (R is alkyl having 1 to 5 carbon atoms); n represents an integer of 1 to 20; and m represents an integer of 5 to 20.]

Examples of the aminocarboxylic acids include 6-aminocaproic acid, 10-aminodecanoic acid, 11-aminoundecanoic acid, 12-amiondodecanoic acid and 18-aminostearic acid. Examples of the lactams include ε-caprolactam, ω-undecanolactam and ω-laurolactam.

The polyamide resin composition can contain various additives, such as heat stabilizers, antioxidants, reinforcing agents, pigments, weathering agents, flame retardants, plasticizers, mold release agents, and the like, as long as the properties of the present invention are not impaired. These additives are added to the polymerization system or while the polyamide resin composition is melt-kneaded or melt-molded.

Suitable heat stabilizers or antioxidants include hindered phenols, phosphorus compounds, hindered amines, sulfur compounds, copper compounds, alkali metal halides, and mixtures thereof.

Suitable reinforcing agents include clay, talc, calcium carbonate, zinc carbonate, wollastonite, silica, alumina, magnesium oxide, calcium silicate, sodium aluminate, sodium aluminosilicate, magnesium silicate, glass balloons, carbon black, zeolite, hydrotalcite, metal fiber, metal whiskers, ceramic whiskers, potassium titanate whiskers, boron nitride, graphite, glass fiber and carbon fiber.

The polyamide resin composition can be mixed with other thermoplastics. In this case, the polymers are blended into the polyamide resin composition when melt-kneaded or melt-molded. Polymers which can be blended into the polyamide resin composition include elastomers such as polybutadiene, butadiene/styrene copolymers, acrylic rubber, ethylene/propylene copolymers, ethylene/propylene/diene copolymers, natural rubber, chlorinated butyl rubber and chlorinated polyethylene, and acid-modified elastomers (e.g., maleic anhydride modified-elastomer), styrene/maleic anhydride copolymers, styrene/phenylmaleimide copolymers, polyethylene, polypropylene, butadiene/acrylonitrile copolymers, poly(vinyl chloride), poly(ethylene terephthalate), polyacetal, poly(vinylidene fluoride), polysulfone, poly(phenylene sulfide), poly(ether sulfone), phenoxy resins, poly(phenylene ether), poly(methyl methacrylate), poly(ether ketone), polycarbonate, polytetrafluoroethylene and polyarylate.

The polyamide resin composition of the present invention can be molded using heat-melting molding methods such as injection molding, extrusion molding, blow molding, and sintering molding. The molded articles thus obtained have highly improved mechanical properties, heat resistance and dimensional stability over those obtained from a polyamide resin alone, and exhibit a low change in mechanical properties and dimension under the influence of water absorption. Moreover, molded articles of the present invention have higher tensile elongation and a small deviation of its values. The molded articles are suitable for housings or mechanical parts (e.g., switches, connectors) in the electric and electronics fields, underhood and exterior parts, chassis parts, or optical parts (e.g., reflectors) in the automobile field, and gears or bearing retainers in the machinery fields.

The polyamide resin composition of the present invention can be converted into films or sheets by general methods such as a tubular method, T-die casting method or solution casting method. Such films or sheets thus obtained are excellent in mechanical property, heat resistance, dimensional stability, and also gas barrier property.

The polyamide resin composition also can be converted into fibers by a conventional process comprising, for example, melt-spinning, drawing, and, if necessary, additional heat-setting. The fibers thus obtained exhibit excellent strength and modulus and also have a small heat shrinkage in a dry state or in boiling water. Such properties are suitable for various forms such as a circle, hollow, and star-like cross section so as to keep their shape.

The present invention will be now illustrated in greater detail with reference to the following Examples. However, the present invention should not be construed as being limited thereto. The raw materials that were used are as follows.

1. Raw Materials (1) Swellable Fluoromica Mineral

A mixture of 85 wt % of talc having been ground in a ball mill to an average particle size of 4 μm and 15 wt % of sodium silicofluoride having the same average particle size was placed in a porcelain crucible and reacted at 850° C. for 1 hour in an electric oven. The resulting powder was analyzed by wide-angle X-ray diffractometry with a Rigaku RAD-rB diffractometer. As a result, the peak corresponding to a thickness of 9.2 Å in the c-axis direction of the starting talc disappeared, and a peak corresponding to 12 to 13 Å was observed, which indicated the production of swellable fluoromica mineral.

The powder was then crushed with a jet mill (a Nippon Pneumatic PJM-200) at an air pressure of 2 to 3 kg/cm², while oversized particles were eliminated by passing through a 400 mesh sieve.

If average particle size and maximum particle size are not within the prescribed ranges by the particle size measurement described below, crushing by the jet-mill and elimination of oversized particles by sieving are repeated to adjust an average particle size and maximum particle size of swellable fluoromica mineral.

The cation exchange capacity of swellable fluoromica mineral thus obtained was 70 meq/100 g according to the method described below.

(2)Montmorillonite

Kunipia F, a highly purified montmorillonite available from Kunimine Kogyo K. K., naturally occurring in Yamagata, Japan (with intercalated Na ions) was used after purifying by elutriation.

Based on the result of particle size measurement, jet-milling and sieving to eliminate oversized particles were conducted, as needed.

The cation exchange capacity of the montmorillonite was 115 meq/100 g according to the method described below.

2. Measurement Methods (a) Cation Exchange Capacity of Swellable fluoromica mineral (meq/100 g)

Measured by the method of Frank O. Jones, Jr. (cf. Clay Handbook, 2nd Ed. p.587 Gihodo Publishing, 1987). In a 250 ml flask, 50 ml of 2 wt % swellable fluoromica mineral aqueous dispersion, 15 ml of 3 wt % aqueous hydroperoxide, and 0.5 ml of 5N sulfuric acid are mildly boiled for 10 minutes. After cooling, 0.5 ml of 1/100N methylene blue solution is added to the mixture while shaking thoroughly for 30 seconds. One droplet of the mixture is taken from the flask with a glass stick, dripped onto a filter paper, and then checked as to whether or not a bright blue ring appears around a dark blue spot. A 0.5 ml portion of the methylene blue solution is repeatedly added until the blue ring appears. When it appears, the flask is shaken for 2 minutes and the paper is again dripped. If the ring disappears after shaking, then the methylene blue solution is added until the ring does not disappear. The end point is established at the point when the ring does not disappear even after shaking for 2 minutes.

Cation exchange capacity of the swellable fluoromica mineral is calculated using the following equation:

Cation Exchange Capacity (meq/100 g)=[amount of added methylene blue (meq)]×100/[amount of swellable fluoromica mineral used (g)]

Because all the interlayer cations of the swellable fluoromica mineral constitute sodium, 1 meq/100 g of the CEC equals 1 mmol/100 g.

(b) Cation Exchange Capacity of Montmorillonite (meq/100 g)

Measured in accordance with a standard method for cation exchange capacity for bentonite (powder) regulated by the Japan Bentonite Association (JBAS-106-77).

In an apparatus equipped with an elution vessel, elution tube and receiving vessel connected in line, substantially all the cations (mainly $Na^+$) between the laminae of montmorillonite are substituted with $NH_4^+$ using a 1 N ammonium acetate aqueous solution, the pH of which is adjusted to 7. After thoroughly washing with water and ethanol, the layered silicate in $NH_4^+$ form is soaked in a 10 wt % potassium chloride solution to replace $NH_4^+$ in the sample by $K^+$. The cation exchange capacity (meq/100 g) of the starting montmorillonite is determined by titrating the eluted $NH_4^+$ with 0.1 N sodium hydroxide solution.

(c) Particle Size Distribution of Layered Silicates as Raw Materials (Average Particle Size, Maximum Particle Size)

Measured with a Shimadzu SALD-2000 particle size distribution analyzer (laser diffraction scattering method) equipped with a flow-cell in methanol as a medium.

(d) Particle Size Distribution of Layered Silicates in Polyamide Resin Composition (Average Particle Size, Maximum Particle Size)

As shown in FIG. 1, an ultra-thin slice is cut out from a perpendicular plane to the flow direction of the resin in a bending test specimen. Length in a long-axis direction of silicate layers in a dispersed state is measured by using photographs taken by transmission electron microscopy (TEM) (Type JEM-200CX, acceleration voltage 100 kV, by Japan Electrics) at a magnification of 60,000. The average particle size of silicate layers is defined as an arithmetic mean of measured sizes of arbitrarily selected 50 silicate layers contained in 10 TEM photographs taken from different parts. The maximum particle size is defined as a maximum layer size measured in the same 10 photographs.

(e) Relative Viscosity of Polyamide Resin Composition

Dried pellets of polyamide resin composition are dissolved in 96% sulfuric acid at a concentration of 1 g/dl. The measurement is done at 25° C.

(f) Tensile Strength, Tensile Modulus, and Tensile Elongation at Break

Measured in accordance with ASTM D-638.

(g) Flexural Strength and Flexural Modulus

Measured in accordance with ASTM D-790.

(h) Izod Impact Strength

Measured on a notched specimen having a thickness of 3.2 mm in accordance with ASTM D-256.

(i) Heat Distortion Temperature

Measured in accordance with ASTM D-648 (load: 1.86 MPa).

EXAMPLE 1

1 kg of ϵ-caprolactam (corresponding to 10 wt % of the total monomer) was dissolved into 2 kg of water, and 200 g of swellable fluoromica mineral (average particle size 3.8 µm, maximum particle size 20 µm by laser diffraction method; total cation exchange capacity corresponding to 0.14 mole) and 16.1 g of 85 wt % phosphoric acid (0.14 mole) were added and agitated for one hour to obtain a mixture. The mixture was introduced into a 30 liter-volume reactor which was in advance charged with 9 kg of ϵ-caprolactam. The temperature and the pressure were then elevated to 260° C. and 5 kg/cm², respectively. The reaction system was maintained at a temperature of 260° C. and a pressure of 5 kg/cm² for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of polyamide-6 resin composition. The pellets were refined in 95° C. hot water for 8 hours and then dried in vacuo. The resulting pellets were injection molded in an injection molding machine (125/75MS Model, manufactured by Mitsubishi Heavy Industries, Ltd.) at a cylinder temperature of 260° C. and a mold temperature of 70° C. for an injection time of 6 seconds and a cooling time of 6 seconds to prepare 3.2 mm thick specimens for testing.

EXAMPLE 2

1 kg of ϵ-caprolactam (corresponding to 10 wt % of the total monomer) was dissolved into 2 kg of water, and 200 g of montmorillonite (average particle size 1.3 µm, maximum particle size 10 µm by laser diffraction method; total cation exchange capacity corresponding to 0.23 mole) and 26.5 g of 85 wt % phosphoric acid (0.23 mole) were added and agitated for 1 hour to obtain a mixture. The mixture was introduced into a 30 liter-volume reactor which was in advance charged with 9 kg of ϵ-caprolactam. Pellets of polyamide-6 resin composition were obtained in the same manner as in Example 1. The pellets after being refined and dried were injection molded in the same manner as in Example 1 to prepare 3.2 mm thick specimens for testing.

EXAMPLE 3

2 kg of ϵ-caprolactam (corresponding to 20 wt % of the total monomer) were dissolved into 2 kg of water, and 200 g of swellable fluoromica mineral (average particle size 3.8 µm, maximum particle size 20 µm by laser diffraction method; total cation exchange capacity corresponding to 0.14 mole) and 16.1 g of 85 wt % phosphoric acid (0.14 mole) were added and agitated for 1 hour to obtain a mixture. The mixture was introduced into a 30 liter-volume reactor which was in advance charged with 8 kg of ε-caprolactam. Pellets of polyamide-6 resin composition were obtained in the same manner as in Example 1. The pellets after being refined and dried were injection molded in the same manner as in Example 1 to prepare 3.2 mm thick specimens for testing.

EXAMPLE 4

2 kg of ε-caprolactam (corresponding to 20 wt % of the total monomer) were dissolved into 2 kg of water, and 200 g of montmorillonite (average particle size 1.3 μm, maximum particle size 10 μm by laser diffraction method; total cation exchange capacity corresponding to 0.23 mole) and 26.5 g of 85 wt % phosphoric acid (0.23 mole) were added and agitated for 1 hour to obtain a mixture. The mixture was introduced into a 30 liter-volume reactor which was in advance charged with 8 kg of ε-caprolactam. Pellets of polyamide-6 resin composition were obtained in the same manner as in Example 1. The pellets after being refined and dried were injection molded in the same manner as in Example 1 to prepare 3.2 mm thick specimens for testing.

Comparative Example 1

Pellets of polyamide-6 resin composition were obtained in the same manner as in Example 1, except that swellable fluoromica mineral having an average particle size of 5.0 μm and a maximum particle size of 100 μm by laser diffraction method was used. The pellets after being refined and dried were injection molded in the same manner as in Example 1 to prepare 3.2 mm thick specimens for testing.

Comparative Example 2

Pellets of polyamide-6 resin composition were obtained in the same manner as in Example 2, except that montmorillonite having an average particle size of 1.5 μm and a maximum particle size of 40 μm by laser diffraction method was used in place of swellable fluoromica mineral. The pellets after being refined and dried were injection molded in the same manner as in Example 1 to prepare 3.2 mm thick specimens for testing.

Table 1 summarizes the results obtained in Examples 1 to 4 and Comparative Examples 1 to 2.

TABLE 1

|  |  | Example No. | | | | Comparative Example No. | |
| --- | --- | --- | --- | --- | --- | --- | --- |
|  |  | 1 | 2 | 3 | 4 | 1 | 2 |
| Layered Silicate | Kind of Layered Silicate | Synthetic Mica | Montmorillonite | Synthetic Mica | Montmorillonite | Synthetic Mica | Montmorillonite |
|  | Particle distribution of layered silicate |  |  |  |  |  |  |
|  | ① Aver. part. size (μm) | 3.8 | 1.3 | 3.8 | 1.3 | 5.0 | 1.5 |
|  | Max. part. size (μm) | 20 | 10 | 20 | 10 | 100 | 40 |
|  | Content of oversized particle* (%) when charged | 0 | 0 | 0 | 0 | 1.6 | 0.8 |
|  | ② Aver. part. size (μm) | 0.08 | 0.06 | 0.08 | 0.05 | 0.63 | 0.37 |
|  | Max. part. size (μm) in PA resin comp. | 0.43 | 0.28 | 0.58 | 0.41 | 50 | 27 |
| Polyamide Resin Composition | Kind of Polyamide | nylon-6 | nylon-6 | nylon-6 | nylon-6 | nylon-6 | nylon-6 |
|  | Added amnt. of layered silicate (parts by wt.) | 2.0 | 2.0 | 2.0 | 2.0 | 2.0 | 2.0 |
|  | Relative Viscosity | 2.6 | 2.6 | 2.6 | 2.6 | 2.6 | 2.6 |
| Properties of Specimen | Tensile strength (MPa) | 91 | 92 | 88 | 88 | 86 | 85 |
|  | Tensile modulus | 3100 | 3100 | 3050 | 3150 | 2850 | 2900 |
|  | Tensile elongation (%) | 66 | 84 | 58 | 79 | 11 | 33 |
|  | Flexural strength (MPa) | 153 | 158 | 149 | 156 | 166 | 162 |
|  | Flexural modulus (MPa) | 4200 | 4250 | 4150 | 4200 | 4400 | 4350 |
|  | Izod impact strength (J/m) | 63 | 66 | 62 | 64 | 46 | 43 |
|  | Heat distortion, temp. (° C.) | 147 | 153 | 142 | 151 | 109 | 120 |

*particle size of 30 μm or more by laser diffraction method

EXAMPLE 5

10 kg of ε-caprolactam, 200 g of swellable fluoromica mineral (average particle size 3.8 μm, maximum particle size 20 μm by laser diffraction method; total cation exchange capacity corresponding to 0.14 mole), 16.1 g of 85 wt % phosphoric acid (0.14 mole), and 2 kg of water were introduced into a 30 liter-volume reactor and agitation was started. The temperature and the pressure were then elevated to 260° C. and 5 kg/cm$^2$, respectively. The reaction system was maintained at a temperature of 260° C. and a pressure of 5 kg/cm$^2$ for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of polyamide 6 resin composition. The pellets after being refined and dried were injection molded in the same manner as in Example 1 to prepare 3.2 mm thick specimens for testing.

EXAMPLE 6

200 kg of ε-caprolactam, 8 kg of swellable fluoromica mineral (average particle size 3.8 μm, maximum particle size 20 μm by laser diffraction method; total cation exchange capacity corresponding to 5.6 moles), 645.6 g of 85 wt % phosphoric acid (5.6 moles), and 6.6 kg of water were introduced into a 500 liter-volume reactor. The temperature and the pressure were then elevated to 260° C. and 5 kg/cm$^2$, respectively, while agitating. The reaction system was maintained at a temperature of 260° C. and a pressure of 5 kg/cm$^2$ for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands from a nozzle equipped with 2 sheets of 240 mesh filter, cooled to solidify, and cut to obtain pellets of polyamide 6 resin composition. Meanwhile pressure increase in the nozzle section was monitored.

The pellets were refined in 95° C. hot water for 8 hours and then dried in vacuo. The resulting pellets were injection molded in an injection molding machine (125/75MS Model, manufactured by Mitsubishi Heavy Industries, Ltd.) at a cylinder temperature of 260° C. and a mold temperature of 70° C. for an injection time of 6 seconds and a cooling time of 6 seconds to prepare 3.2 mm thick specimens for testing.

EXAMPLE 7

200 kg of ε-caprolactam, 8 kg of montmorillonite (average particle size 1.3 μm, maximum particle size 10 μm by laser diffraction method; total cation exchange capacity corresponding to 9.2 moles), 1060.7 g of 85 wt % phosphoric acid (9.2 moles), and 6.6 kg of water were introduced into a 500 liter-volume reactor. Pellets of polyamide-6 resin composition were obtained in the same manner as in Example 5, while pressure increase in the nozzle section (equipped with 2 sheets of 240 mesh filter) was monitored.

The pellets after being refined and dried were injection molded in the same manner as in Example 5 to prepare 3.2 mm thick specimens for testing.

Comparative Example 3

Pellets of polyamide-6 resin composition were obtained in the same manner as in Example 6, except that swellable fluoromica mineral having an average particle size of 5.0 μm and a maximum particle size of 100 μm by laser diffraction method was used. Pressure increase in the nozzle section (equipped with 2 sheets of 240 mesh filter) was monitored.

The pellets after being refined and dried were injection molded in the same manner as in Example 5 to prepare 3.2 mm thick specimens for testing.

Comparative Example 4

Pellets of polyamide-6 resin composition were obtained in the same manner as in Comparative Example 7, except that montmorillonite having an average particle size of 1.5 μm and a maximum particle size of 40 μm by laser diffraction method was used. Pressure increase in the nozzle section (equipped with 2 sheets of 240 mesh filter) was monitored.

The pellets after being refined and dried were injection molded in the same manner as in Example 5 to prepare 3.2 mm thick specimens for testing.

Table 2 summarizes the results obtained in Examples 5 to 7 and Comparative Examples 3 to 4.

TABLE 2

|  |  | Example No. | | | Comparative Example No. | |
|---|---|---|---|---|---|---|
|  |  | 5 | 6 | 7 | 3 | 4 |
|  | Kind of Layered Silicate | Synthetic Mica | Synthetic Mica | Montmorillonite | Synthetic Mica | Montmorillonite |
| Layered Silicate | Particle distribution of layered silicate | | | | | |
|  | ① Aver. part. size (μm) | 3.8 | 3.8 | 1.3 | 5.0 | 1.5 |
|  | Max. part. size (μm) | 20 | 20 | 10 | 100 | 40 |
|  | Content of oversized particle* (%) when charged | 0 | 0 | 0 | 1.6 | 0.8 |
|  | ② Aver. part. size (μm) | 0.08 | 0.09 | 0.09 | 0.68 | 0.42 |
|  | Max. part. size (μm) in PA resin comp. | 0.62 | 0.48 | 0.36 | 55 | 34 |
| Polyamide Resin Composition | Kind of Polyamide | nylon-6 | nylon-6 | nylon-6 | nylon-6 | nylon-6 |
|  | Added amnt. of layered silicate (parts by wt.) | 2.0 | 4.0 | 4.0 | 4.0 | 4.0 |
| Properties of Specimen | Relative Viscosity | 2.6 | 2.6 | 2.6 | 2.6 | 2.6 |
|  | Tensile strength (MPa) | 82 | 84 | 85 | 81 | 82 |
|  | Tensile modulus | 3050 | 3150 | 3100 | 3200 | 2900 |
|  | Tensile elongation (%) | 56 | 36 | 75 | 9 | 25 |
|  | Flexural strength (MPa) | 147 | 150 | 155 | 169 | 158 |
|  | Flexural modulus (MPa) | 4150 | 4250 | 4200 | 4350 | 4200 |
|  | Izod impact strength (J/m) | 64 | 58 | 62 | 46 | 42 |
|  | Heat distortion, temp. (° C.) | 142 | 148 | 150 | 118 | 122 |

*particle size of 30 μm or more by laser diffraction method

EXAMPLE 8

10 kg of 11-aminoundecanoic acid, 200 g of swellable fluoromica mineral (average particle size 3.8 μm, maximum particle size 20 μm by laser diffraction method; total cation exchange capacity corresponding to 0.14 mole) and 16.1 g of 85 wt % phosphoric acid (0.14 mole) were introduced into a 30 liter-volume reactor. The temperature was then elevated to 220° C. and polymerization was conducted under nitrogen for 2 hours. The reaction mixture was withdrawn in strands, cooled to solidify, and cut to obtain pellets of polyamide-11 resin composition. The pellets after being dried were injection molded in an injection molding machine (125/75MS Model, manufactured by Mitsubishi Heavy Industries, Ltd.) at a cylinder temperature of 230° C. and a mold temperature of 70° C. for an injection time of 6 seconds and a cooling time of 10 seconds to prepare 3.2 mm thick specimens for testing.

EXAMPLE 9

10 kg of 11-aminoundecanoic acid, 400 g of swellable fluoromica mineral (average particle size 3.8 $\mu$m, maximum particle size 20 $\mu$m by laser diffraction method; total cation exchange capacity corresponding to 0.28 mole) and 32.3 g of 85 wt % phosphoric acid (0.28 mole) were introduced into a 30 liter-volume reactor. Pellets of polyamide-11 resin composition were obtained in the same manner as in Example 8. The pellets after being dried were injection molded in the same manner as in Example 8 to prepare 3.2 mm thick specimens for testing.

EXAMPLE 10

10 kg of 11-aminoundecanoic acid, 200 g of montmorillonite (average particle size 1.3 $\mu$m, maximum particle size 10 $\mu$m by laser diffraction method; total cation exchange capacity corresponding to 0.23 mole) and 26.5 g of 85 wt % phosphoric acid (0.23 mole) were introduced into a 30 liter-volume reactor. The temperature was then elevated to 220° C. and polymerization was conducted under nitrogen for 2 hours. Pellets of polyamide-11 resin composition were obtained in the same manner as in Example 8. The pellets after being dried were injection molded in the same manner as in Example 8 to prepare 3.2 mm thick specimens for testing.

Comparative Example 5

Pellets of polyamide-11 resin composition were obtained in the same manner as in Example 8, except that swellable fluoromica mineral having an average particle size of 5.0 $\mu$m and a maximum particle size of 100 $\mu$m by laser diffraction method was used. The pellets after being dried were injection molded in the same manner as in Example 8 to prepare 3.2 mm thick specimens for testing.

Comparative Example 6

Pellets of polyamide-11 resin composition were obtained in the same manner as in Example 10, except that montmorillonite having an average particle size of 1.5 $\mu$m and a maximum particle size of 40 $\mu$m by laser diffraction method was used. The pellets after being dried were injection molded in the same manner as in Example 8 to prepare 3.2 mm thick specimens for testing.

Table 3 summarizes the results obtained in Examples 8 to 10 and Comparative Examples 5 to 6.

TABLE 3

|  |  | Example No. | | | Comparative Example No. | |
|---|---|---|---|---|---|---|
|  |  | 8 | 9 | 10 | 5 | 6 |
| Layered Silicate | Kind of Layered Silicate | Synthetic Mica | Synthetic Mica | Montmorillonite | Synthetic Mica | Montmorillonite |
|  | Particle distribution of layered silicate |  |  |  |  |  |
|  | ① Aver. part. size ($\mu$m) | 3.8 | 3.8 | 1.3 | 5.0 | 1.5 |
|  | Max. part. size ($\mu$m) | 20 | 20 | 10 | 100 | 40 |
|  | Content of oversized particle* (%) when charged | 0 | 0 | 0 | 1.6 | 0.8 |
|  | ② Aver. part. size ($\mu$m) | 0.09 | 0.08 | 0.07 | 0.70 | 0.46 |
|  | Max. part. size ($\mu$m) in PA resin comp. | 0.89 | 0.93 | 0.41 | 63 | 39 |
| Polyamide Resin Composition | Kind of Polyamide | nylon-11 | nylon-11 | nylon-11 | nylon-11 | nylon-11 |
|  | Added amnt. of layered silicate (parts by wt.) | 2.0 | 4.0 | 2.0 | 2.0 | 2.0 |
|  | Relative Viscosity | 2.6 | 2.6 | 2.6 | 2.6 | 2.6 |
| Properties of Specimen | Tensile strength (MPa) | 59 | 63 | 60 | 58 | 57 |
|  | Tensile modulus | 2100 | 2150 | 2050 | 2050 | 2000 |
|  | Tensile elongation (%) | 173 | 128 | 189 | 144 | 152 |
|  | Flexural strength (MPa) | 75 | 79 | 74 | 83 | 77 |
|  | Flexural modulus (MPa) | 2250 | 2450 | 2200 | 2400 | 2300 |
|  | Izod impact strength (J/m) | 66 | 57 | 70 | 58 | 60 |
|  | Heat distortion, temp. (° C.) | 71 | 82 | 69 | 57 | 55 |

*particle size of 30 $\mu$m or more by laser diffraction method

EXAMPLE 11

10 kg of ω-laurolactam, 200 g of swellable fluoromica mineral (average particle size 3.8 $\mu$m, maximum particle size 20 $\mu$m by laser diffraction method; total cation exchange capacity corresponding to 0.14 mole), 16.1 g of 85 wt % phosphoric acid (0.14 mole) and 1.5 kg of water were introduced into a 30 liter-volume reactor. The temperature and pressure were then elevated to 280° C., 22 kg/cm², respectively. The reaction system was maintained at a temperature of 290~300° C. and a pressure of 22 kg/cm² for 12 hours to conduct polymerization while gradually releasing steam, followed by pressure release to atmospheric pressure over a 1 hour period. After standing under conditions of atmospheric pressure for 40 minutes, the reaction mixture was withdrawn in strands, cooled to solidify, and cut to obtain pellets of polyamide-12 resin composition. The pellets after being dried were injection molded in an injection molding machine (125/75MS Model, manufactured by Mitsubishi Heavy Industries, Ltd.) at a cylinder temperature of 230° C. and a mold temperature of 70° C. for an injection time of 6 seconds and a cooling time of 10 seconds to prepare 3.2 mm thick specimens for testing.

EXAMPLE 12

10 kg of ω-laurolactam, 400 g of swellable fluoromica mineral (average particle size 3.8 μm, maximum particle size 20 μm by laser diffraction method; total cation exchange capacity corresponding to 0.28 mole), 32.3 g of 85 wt % phosphoric acid (0.28 mole) and 1.5 kg of water were introduced into a 30 liter-volume reactor. Pellets of polyamide-12 resin composition were obtained in the same manner as in Example 11. The pellets after being dried were injection molded in the same manner as in Example 11 to prepare 3.2 mm thick specimens for testing.

EXAMPLE 13

10 kg of ω-laurolactam, 200 g of montmorillonite (average particle size 1.3 μm, maximum particle size 10 μm by laser diffraction method; total cation exchange capacity corresponding to 0.23 mole), 26.5 g of 85 wt % phosphoric acid (0.23 mole), and 1.5 kg of water were introduced into a 30 liter-volume reactor. Pellets of polyamide-12 resin composition were obtained in the same manner as in Example 11. The pellets after being dried were injection molded in the same manner as in Example 11 to prepare 3.2 mm thick specimens for testing.

Comparative Example 7

Pellets of polyamide-12 resin composition were obtained in the same manner as in Example 11, except that swellable fluoromica mineral having an average particle size of 5.0 μm and a maximum particle size of 100 μm by laser diffraction method was used. The pellets after being dried were injection molded in the same manner as in Example 11 to prepare 3.2 mm thick specimens for testing.

Comparative Example 8

Pellets of polyamide-12 resin composition were obtained in the same manner as in Example 13, except that montmorillonite having an average particle size of 1.5 μm and a maximum particle size of 40 μm by laser diffraction method was used. The pellets after being dried were injection molded in the same manner as in Example 11 to prepare 3.2 mm thick specimens for testing.

Table 4 summarizes the results obtained in Examples 11 to 13 and Comparative Examples 7 to 8.

TABLE 4

|  |  | Example No. | | | Comparative Example No. | |
|---|---|---|---|---|---|---|
|  |  | 11 | 12 | 13 | 7 | 8 |
|  | Kind of Layered Silicate | Synthetic Mica | Synthetic Mica | Montmorillonite | Synthetic Mica | Montmorillonite |
| Layered Silicate | Particle distribution of layered silicate | | | | | |
|  | ① Aver. part. size (μm) | 3.8 | 3.8 | 1.3 | 5.0 | 1.5 |
|  | Max. part. size (μm) | 20 | 20 | 10 | 100 | 40 |
|  | Content of oversized particle* (%) when charged | 0 | 0 | 0 | 1.6 | 0.8 |
|  | ② Aver. part. size (μm) | 0.09 | 0.09 | 0.08 | 0.76 | 0.45 |
|  | Max. part. size (μm) in PA resin comp. | 1.2 | 0.98 | 0.39 | 71 | 40 |
| Polyamide Resin | Kind of Polyamide | nylon-12 | nylon-12 | nylon-12 | nylon-12 | nylon-12 |
|  | Added amnt. of layered silicate (parts by wt.) | 2.0 | 4.0 | 2.0 | 2.0 | 2.0 |
| Composition Properties of Specimen | Relative Viscosity | 2.6 | 2.6 | 2.6 | 2.6 | 2.6 |
|  | Tensile strength (MPa) | 60 | 63 | 59 | 56 | 55 |
|  | Tensile modulus | 2000 | 2300 | 1950 | 2050 | 2050 |
|  | Tensile elongation (%) | 141 | 135 | 166 | 120 | 132 |
|  | Flexural strength (MPa) | 75 | 93 | 78 | 88 | 86 |
|  | Flexural modulus (MPa) | 2250 | 2400 | 2300 | 2350 | 2350 |
|  | Izod impact strength (J/m) | 68 | 55 | 67 | 54 | 55 |
|  | Heat distortion, temp. (° C.) | 73 | 81 | 71 | 56 | 55 |

*particle size of 30 μm or more by laser diffraction method

EXAMPLE 14

200 g of swellable fluoromica mineral (average particle size 3.8 μm, maximum particle size 20 μm by laser diffraction method; total cation exchange capacity corresponding to 0.14 mole) were added to a premixed solution containing 15.8 g of ε-caprolactam (0.14 mole), 10 kg of water, and 16.1 g of 85 wt % phosphoric acid (0.14 mole). The mixture containing organic fluoromica was obtained after agitating at 70° C. for 60 minutes with a homogenizer. Organic fluoromica was recovered by repeated filtering and washing with a Buchner funnel, then dried and crushed.

190 g of the above-described organic fluoromica were introduced into a 30 liter-volume reactor which was in advance charged with 10 kg of ε-caprolactam and 1 kg of water. The temperature and the pressure were then elevated to 260° C. and 5 kg/cm², respectively. The reaction system was maintained at a temperature of 260° C. and a pressure of 5 kg/cm² for 2 hours to conduct polymerization while gradually releasing steam, followed by pressure release to atmospheric pressure over a 1 hour period. After standing under conditions of atmospheric pressure and 260° C. for 40 minutes, the reaction mixture was withdrawn in strands, cooled to solidify, and cut to obtain pellets of polyamide-6 resin composition. The pellets were refined in 95° C. hot water for 8 hours and then dried in vacuo. The resulting pellets were injection molded in an injection molding machine (125/75MS Model, manufactured by Mitsubishi Heavy Industries, Ltd.) at a cylinder temperature of 260° C. and a mold temperature of 70° C. for an injection time of 6 seconds and a cooling time of 10 seconds to prepare 3.2 mm thick specimens for testing.

EXAMPLE 15

200 g of swellable fluoromica mineral (average particle size 1.3 μm, maximum particle size 100 μm by laser diffraction method; total cation exchange capacity corresponding to 0.23 mole) were added to a premixed solution containing 26.0 g of ε-caprolactam (0.23 mole), 10 kg of water, and 26.5 g of 85 wt % phosphoric acid (0.23 mole). The mixture containing organic montmorillonite was obtained after agitating at 70° C. for 60 minutes with a homogenizer. Organic montmorillonite was recovered by repeated filtering and washing with a Buchner funnel, then dried and crushed.

190 g of the above-described organic montmorillonite were introduced into a 30 liter-volume reactor which was in advance charged with 10 kg of ε-caprolactam and 1 kg of water. Pellets of polyamide-6 resin composition were obtained in the same manner as in Example 14. The pellets after being refined and dried injection molded in the same manner as in Example 14 to prepare 3.2 mm thick specimens for testing.

EXAMPLE 16

A solution containing 1 kg of ε-caprolactam (corresponding to 10 wt % of the total monomer) and 2 kg of water, 200 g of swellable fluoromica mineral (average particle size 3.8 μm, maximum particle size 20 μm by laser diffraction method; total cation exchange capacity corresponding to 0.14 mole), and 16.1 g of 85 wt % phosphoric acid (0.14 mole) were mixed. The mixture containing organic fluoromica was obtained after agitating at 70° C. for 60 minutes with a homogenizer.

The above mixture was introduced into a 30 liter-volume reactor which was in advance charged with 9 kg of ε-caprolactam. Pellets of polyamide-6 resin composition were obtained in the same manner as in Example 14. The pellets after being refined and dried were injection molded in the same manner as in Example 14 to prepare 3.2 mm thick specimens for testing.

EXAMPLE 17

A solution containing 1 kg of ε-caprolactam (corresponding to 10 wt % of the total monomer) and 2 kg of water, 200 g of montmorillonite (average particle size 1.3 μm, maximum particle size 10 μm by laser diffraction method; total cation exchange capacity corresponding to 0.23 mole), and 26.5 g of 85 wt % phosphoric acid (0.23 mole) were mixed. The mixture containing organic montmorillonite was obtained after agitating at 70° C. for 60 minutes with a homogenizer.

The above mixture was introduced into a 30 liter-volume reactor which was in advance charged with 9 kg of ε-caprolactam. Pellets of polyamide-6 resin composition were obtained in the same manner as in Example 14. The pellets after being refined and dried were injection molded in the same manner as in Example 14 to prepare 3.2 mm thick specimens for testing.

Comparative Example 9

Pellets of polyamide-6 resin composition were obtained in the same manner as in Example 14, except that swellable fluoromica mineral having an average particle size of 5.0 μm and a maximum particle size of 100 μm by laser diffraction method was used. The pellets after being dried were injection molded in the same manner as in Example 14 to prepare 3.2 mm thick specimens for testing.

Comparative Example 10

Pellets of polyamide-6 resin composition were obtained in the same manner as in Example 15, except that montmorillonite having an average particle size of 1.5 μm and a maximum particle size of 40 μm by laser diffraction method was used. The pellets after being dried were injection molded in the same manner as in Example 14 to prepare 3.2 mm thick specimens for testing.

Comparative Example 11

Pellets of polyamide-6 resin composition were obtained in the same manner as in Example 16, except that swellable fluoromica mineral having an average particle size of 5.0 μm and a maximum particle size of 100 μm by laser diffraction method was used. The pellets after being dried were injection molded in the same manner as in Example 14 to prepare 3.2 mm thick specimens for testing.

Comparative Example 12

Pellets of polyamide-6 resin composition were obtained in the same manner as in Example 17, except that montmorillonite having an average particle size of 1.5 μm and a maximum particle size of 40 μm by laser diffraction method was used. The pellets after being dried were injection molded in the same manner as in Example 14 to prepare 3.2 mm thick specimens for testing.

Table 5 summarizes the results obtained in Examples 14 to 17 and Comparative Examples 9 to 12.

TABLE 5

|  |  | Example No. | | | | Comparative Example No. | | | |
| --- | --- | --- | --- | --- | --- | --- | --- | --- | --- |
|  |  | 14 | 15 | 16 | 17 | 9 | 10 | 11 | 12 |
| Layered Silicate | Kind of Layered Silicate | Synthetic Mica | Montmorillonite | Synthetic Mica | Montmorillonite | Synthetic Mica | Montmorillonite | Synthetic Mica | Montmorillonite |
|  | Particle distribution of layered silicate | | | | | | | | |
|  | ① Aver. part. size ($\mu$m) | 3.8 | 1.3 | 3.8 | 1.3 | 5.0 | 1.5 | 5.0 | 1.5 |
|  | Max. part. size ($\mu$m) | 20 | 10 | 20 | 10 | 100 | 40 | 100 | 40 |
|  | Content of oversized particle* (%) when charged | 0 | 0 | 0 | 0 | 1.6 | 0.8 | 1.6 | 0.8 |
|  | ② Aver. part. size ($\mu$m) | 0.04 | 0.04 | 0.07 | 0.03 | 0.22 | 0.28 | 0.31 | 0.28 |
|  | Max. part. size ($\mu$m) in PA resin comp. | 0.21 | 0.21 | 0.38 | 0.13 | 35 | 33 | 42 | 33 |
| Polyamide Resin Composition | Kind of Polyamide | nylon-6 | nylon-6 | nylon-6 | nylon-6 | nylon-6 | nylon-6 | nylon-6 | nylon-6 |
|  | Added amnt. of layered silicate (parts by wt.) | 2.0 | 2.0 | 2.0 | 2.0 | 2.0 | 2.0 | 2.0 | 2.0 |
|  | Relative Viscosity | 2.6 | 2.6 | 2.6 | 2.6 | 2.6 | 2.6 | 2.6 | 2.6 |
| Properties of Specimen | Tensile strength (MPa) | 93 | 93 | 94 | 92 | 86 | 84 | 85 | 87 |
|  | Tensile modulus | 3250 | 3200 | 3150 | 3150 | 2900 | 2850 | 2850 | 2800 |
|  | Tensile elongation (%) | 107 | 135 | 95 | 121 | 22 | 78 | 14 | 57 |
|  | Flexural strength (MPa) | 154 | 161 | 156 | 164 | 167 | 167 | 169 | 159 |
|  | Flexural modulus (MPa) | 4300 | 4200 | 4350 | 4250 | 4500 | 4550 | 4600 | 4250 |
|  | Izod impact strength (J/m) | 65 | 64 | 66 | 65 | 48 | 47 | 50 | 51 |
|  | Heat distortion, temp. (° C.) | 155 | 151 | 150 | 155 | 111 | 110 | 110 | 109 |

*particle size of 30 $\mu$m or more by laser diffraction method

EXAMPLE 18

200 g of swellable fluoromica mineral (average particle size 3.8 $\mu$m, maximum particle size 20 $\mu$m by laser diffraction method; total cation exchange capacity corresponding to 0.14 mole) were added to a premixed solution containing 28.1 g of 11-aminoundecanoic acid (0.14 mole), 10 kg of water, and 16.1 g of 85 wt % phosphoric acid (0.14 mole). The mixture containing organic fluoromica was obtained after agitating at 70° C. for 60 minutes with a homogenizer. Organic fluoromica was recovered by repeated filtering and washing with a Buchner funnel, then dried and crushed.

190 g of the above-described organic fluoromica were introduced into a 30 liter-volume reactor which was in advance charged with 10 kg of 11-aminoundecanoic acid. The temperature was then elevated to 220° C. and polymerization was conducted under nitrogen for 2 hours. The reaction mixture was withdrawn in strands, cooled to solidify, and cut to obtain pellets of polyamide-11 resin composition. The pellets were injection molded in an injection molding machine (125/75MS Model, manufactured by Mitsubishi Heavy Industries, Ltd.) at a cylinder temperature of 230° C. and a mold temperature of 70° C. for an injection time of 6 seconds and a cooling time of 10 seconds to prepare 3.2 mm thick specimens for testing.

EXAMPLE 19

200 g of montmorillonite (average particle size 1.3 $\mu$m, maximum particle size 10 $\mu$m by laser diffraction method; total cation exchange capacity corresponding to 0.23 mole) were added to a premixed solution containing 46.2 g of 11-aminoundecanoic acid (0.23 mole), 10 kg of water, and 26.5 g of 85 wt % phosphoric acid (0.23 mole). The mixture containing organic montmorillonite was obtained after agitating at 70° C. for 60 minutes with a homogenizer. Organic montmorillonite was recovered by repeated filtering and washing with a Buchner funnel, then dried and crushed.

Pellets of polyamide-11 resin composition were obtained in the same manner as in Example 18. The pellets after being dried were injection molded in the same manner as in Example 18 to prepare 3.2 mm thick specimens for testing.

Comparative Example 13

Pellets of polyamide-11 resin composition were obtained in the same manner as in Example 18, except that swellable fluoromica mineral having an average particle size of 5.0 $\mu$m and a maximum particle size of 100 $\mu$m by laser diffraction method was used. The pellets after being dried were injection molded in the same manner as in Example 18 to prepare 3.2 mm thick specimens for testing.

Comparative Example 14

Pellets of polyamide-11 resin composition were obtained in the same manner as in Example 19, except that montmorillonite having an average particle size of 1.5 $\mu$m and a maximum particle size of 40 $\mu$m by laser diffraction method was used. The pellets after being dried were injection molded in the same manner as in Example 18 to prepare 3.2 mm thick specimens for testing.

Table 6 summarizes the results obtained in Examples 18 to 19 and Comparative Examples 13 to 14.

TABLE 6

|  |  | Example No. | | Comparative Example No. | |
| --- | --- | --- | --- | --- | --- |
|  |  | 18 | 19 | 13 | 14 |
|  | Kind of Layered Silicate | Synthetic Mica | Montmorillonite | Synthetic Mica | Montmorillonite |
| Layered Silicate | Particle distribution of layered silicate | | | | |
|  | ① Aver. part. size ($\mu$m) | 3.8 | 1.3 | 5.0 | 1.5 |
|  | Max. part. size ($\mu$m) | 20 | 10 | 100 | 40 |
|  | Content of oversized | 0 | 0 | 1.6 | 0.8 |

TABLE 6-continued

|  |  | Example No. | | Comparative Example No. | |
| --- | --- | --- | --- | --- | --- |
|  | Kind of Layered Silicate | 18 Synthetic Mica | 19 Mont-morillo-nite | 13 Synthetic Mica | 14 Mont-morillo-nite |
|  | particle* (%) when charged ②Aver. part. size (μm) | 0.04 | 0.04 | 0.31 | 0.25 |
|  | Max. part. size (μm) in PA resin comp. | 0.36 | 0.32 | 45 | 35 |
| Poly-amide Resin Compo-sition | Kind of Polyamide | nylon-11 | nylon-11 | nylon-11 | nylon-11 |
|  | Added amnt. of layered silicate (parts by wt) | 2.0 | 2.0 | 2.0 | 2.0 |
|  | Relative Viscosity | 2.6 | 2.6 | 2.6 | 2.6 |
| Proper-ties of Speci-men | Tensile strength (MPa) | 63 | 62 | 58 | 61 |
|  | Tensile modulus | 2350 | 2300 | 2200 | 2100 |
|  | Tensile elongation (%) | >200 | >200 | 113 | 126 |
|  | Flexural strength (MPa) | 79 | 77 | 84 | 88 |
|  | Flexural modulus (MPa) | 2400 | 2350 | 2550 | 2500 |
|  | Izod impact strength (J/m) | 80 | 74 | 60 | 62 |
|  | Heat distortion. temp. (° C.) | 77 | 75 | 58 | 55 |

*particle size of 30 μm or more by laser diffraction method

EXAMPLE 20

200 g of swellable fluoromica mineral (average particle size 3.8 μm, maximum particle size 20 μm by laser diffraction method; total cation exchange capacity corresponding to 0.14 mole) were added to a premixed solution containing 27.6 g of ω-laurolactam (0.14 mole), 10 kg of water, and 16.1 g of 85 wt % phosphoric acid (0.14 mole). The mixture containing organic fluoromica was obtained after agitating at 70° C. for 60 minutes with a homogenizer. Organic fluoromica was recovered by repeated filtering and washing with a Buchner funnel, then dried and crushed.

190 g of the above-described organic fluoromica were introduced into a 30 liter-volume reactor which was in advance charged with 10 kg of ω-laurolactam. The temperature and the pressure were then elevated to 280° C. and 22 kg/cm², respectively, while agitating. The reaction system was maintained at a temperature of 290~300° C. and a pressure of 22 kg/cm² for 12 hours to conduct polymerization while gradually releasing steam, followed by pressure release to atmospheric pressure over a 1 hour period. After standing under conditions of atmospheric pressure for 40 minutes, the reaction mixture was withdrawn in strands, cooled to solidify, and cut to obtain pellets of polyamide-12 resin composition. The pellets after being dried were injection molded in an injection molding machine (125/75MS Model, manufactured by Mitsubishi Heavy Industries, Ltd.) at a cylinder temperature of 230° C. and a mold temperature of 70° C. for an injection time of 6 seconds and a cooling time of 10 seconds to prepare 3.2 mm thick specimens for testing.

EXAMPLE 21

200 g of montmorillonite (average particle size 1.3 μm, maximum particle size 10 μm by laser diffraction method; total cation exchange capacity corresponding to 0.23 mole) were added to a premixed solution containing 45.3 g of ω-laurolactam (0.23 mole), 10 kg of water, and 26.5 g of 85 wt % phosphoric acid (0.14 mole). The mixture containing organic montmorillonite was obtained after agitating at 70° C. for 60 minutes with a homogenizer. Organic montmorillonite was recovered by repeated filtering and washing with a Buchner funnel, then dried and crushed.

Pellets of polyamide-12 resin composition were obtained in the same manner as in Example 20. The pellets after being dried were injection molded in the same manner as in Example 20 to prepare 3.2 mm thick specimens for testing.

EXAMPLE 22

A solution containing 1 kg of ω-laurolactam (corresponding to 10 wt % of the total monomer) and 1.5 kg of water, 200 g of swellable fluoromica mineral (average particle size 3.8 μm, maximum particle size 20 μm by laser diffraction method; total cation exchange capacity corresponding to 0.14 mole), and 16.1 g of 85 wt % phosphoric acid (0.14 mole) were charged into a 30 liter-volume reactor while agitating at 160° C. for 60 minutes to prepare a mixture containing organic fluoromica.

The above-described mixture was introduced through a transporting pipe into a 30 liter-volume reactor which was in advance charged with 9 kg of ω-laurolactam. The temperature and the pressure were then elevated to 280° C. and 22 kg/cm², respectively, while agitating. The reaction system was maintained at a temperature of 290~300° C. and a pressure of 22 kg/cm² for 12 hours to conduct polymerization while gradually releasing steam, followed by pressure release to atmospheric pressure over a 1 hour period. After standing under conditions of atmospheric pressure for 40 minutes, the reaction mixture was withdrawn in strands, cooled to solidify, and cut to obtain pellets of polyamide-12 resin composition. The pellets after being dried were injection molded in an injection molding machine (125/75MS Model, manufactured by Mitsubishi Heavy Industries, Ltd.) at a cylinder temperature of 230° C. and a mold temperature of 70° C. for an injection time of 6 seconds and a cooling time of 10 seconds to prepare 3.2 mm thick specimens for testing.

Comparative Example 15

Pellets of polyamide-12 resin composition were obtained in the same manner as in Example 20, except that swellable fluoromica mineral having an average particle size of 5.0 μm and a maximum particle size of 100 μm by laser diffraction method was used. The pellets after being dried were injection molded in the same manner as in Example 20 to prepare 3.2 mm thick specimens for testing.

Comparative Example 16

Pellets of polyamide-12 resin composition were obtained in the same manner as in Example 21, except that montmorillonite having an average particle size of 1.5 μm and a maximum particle size of 40 μm by laser diffraction method was used. The pellets after being dried were injection molded in the same manner as in Example 20 to prepare 3.2 mm thick specimens for testing.

Comparative Example 17

Pellets of polyamide-12 resin composition were obtained in the same manner as in Example 22, except that swellable fluoromica mineral having an average particle size of 5.0 μm and a maximum particle size of 100 μm by laser diffraction method was used. The pellets after being dried were injection molded in the same manner as in Example 20 to prepare 3.2 mm thick specimens for testing.

Table 7 summarizes the results obtained in Examples 20 to 22 and Comparative Examples 15 to 17.

TABLE 7

|  |  | Example No. | | | Comparative Example No. | | |
| --- | --- | --- | --- | --- | --- | --- | --- |
|  |  | 20 | 21 | 22 | 15 | 16 | 17 |
| Layered Silicate | Kind of Layered Silicate | Synthetic Mica | Montmorillonite | Synthetic Mica | Synthetic Mica | Montmorillonite | Synthetic Mica |
|  | Particle distribution of layered silicate |  |  |  |  |  |  |
|  | ①  Aver. part. size (μm) | 3.8 | 1.3 | 3.8 | 5.0 | 1.5 | 5.0 |
|  | Max. part. size (μm) | 20 | 10 | 20 | 100 | 40 | 100 |
|  | Content of oversized particle* (%) when charged | 0 | 0 | 0 | 1.6 | 0.8 | 1.6 |
|  | ②  Aver. part. size (μm) | 0.04 | 0.03 | 0.04 | 0.29 | 0.29 | 0.30 |
|  | Max. part. size (μm) in PA resin comp. | 0.35 | 0.31 | 0.33 | 0.42 | 37 | 50 |
| Polyamide Resin Composition | Kind of Polyamide | nylon-12 | nylon-12 | nylon-12 | nylon-12 | nylon-12 | nylon-12 |
|  | Added amnt. of layered silicate (parts by wt.) | 2.0 | 2.0 | 2.0 | 2.0 | 2.0 | 2.0 |
| Properties of Specimen | Relative Viscosity | 2.6 | 2.6 | 2.6 | 2.6 | 2.6 | 2.6 |
|  | Tensile strength (MPa) | 64 | 63 | 62 | 60 | 62 | 59 |
|  | Tensile modulus | 2350 | 2300 | 2300 | 2200 | 2200 | 2250 |
|  | Tensile elongation (%) | >200 | >200 | 183 | 127 | 141 | 126 |
|  | Flexural strength (MPa) | 85 | 83 | 93 | 93 | 94 | 97 |
|  | Flexural modulus (MPa) | 2400 | 2400 | 2400 | 2650 | 2550 | 2750 |
|  | Izod impact strength (J/m) | 83 | 72 | 78 | 61 | 63 | 70 |
|  | Heat distortion, temp. (° C.) | 78 | 71 | 73 | 59 | 58 | 59 |

*particle size of 30 μm or more by laser diffraction method

TEM photographic observation was conducted for each specimen for flexural strength measurement prepared in Examples 1~22. The layered silicates in the polyamide resins had average particle sizes falling within a range of 0.03~0.09 μm and contained no particles having a maximum size of 30 μm or more. In all the Examples, the layered silicates were confirmed to be uniformly dispersed on the molecular level in polyamides.

On the other hand, the average particle sizes of the layered silicates exceeded 0.1 μm in all the TEM photographs taken for each specimen for flexural strength measurement prepared in Comparative Examples 1~17, which indicates insufficient uniform dispersion on the molecular level.

The present invention provides a polyamide resin composition which provides molded articles exhibiting high strength, high modulus, high heat resistance, high toughness, excellent dimensional stability, and high tensile elongation with a small deviation.

What is claimed is:

1. A polyamide resin composition in which a swellable fluoromica mineral having the below-described property ① is uniformly dispersed on a molecular level, wherein
   ①: average particle size from a photograph observation of transmission electron microscopy is 0.1 μm or less and not including a maximum particle size of 30 μm or higher.

2. The polyamide resin composition according to claim 1, wherein said polyamide resin is one selected from the group consisting of nylon 6, nylon-6 copolymers, nylon 11, nylon-11 copolymers, nylon 12 and nylon-12 copolymers.

3. The polyamide resin composition according to claim 1, wherein 0.1~10 parts by weight of the swellable fluoromica mineral having the above-described property ① per 100 parts by weight of said polyamide resin are formulated.

4. The polyamide resin composition according to claim 2, wherein 0.1~10 parts by weight of the swellable fluoromica mineral having the above-described property ① per 100 parts by weight of said polyamide resin are formulated.

5. A process for producing the polyamide resin composition of claim 3, which comprises polymerizing a monomer forming 100 parts by weight of polyamide resin after mixing with 0.1~10 parts by weight of a swellable fluoromica mineral of the below-described property ② having a cation exchange capacity of 50~200 meq/100 g and an acid (pKa 0~6 or negative in 25° C. water) in an amount of 3 times or less moles per the total cation exchange capacity of the above-described swellable fluoromica mineral, wherein the total amount of the above-described swellable fluoromica mineral and the total amount of the above-described acid are mixed with a fraction of the monomer corresponding to 30 wt % or less to the total amount of the above-described monomer, followed by addition of the rest of the monomer and polymerization of the monomer, wherein
   ②: average particle size of 1~6 μm by laser diffraction method; not containing particles of 30 μm or larger as a maximum particle size.

6. A process for producing the polyamide resin composition of claim 4, which comprises polymerizing a monomer forming 100 parts by weight of polyamide resin after mixing with 0.1~10 parts by weight of a swellable fluoromica mineral of the above-described property ② having a cation exchange capacity of 50~200 meq/100 g and an acid (pKa 0~6 or negative in 25° C. water) in an amount of 3 times or less moles per the total cation exchange capacity of the above-described swellable fluoromica mineral, wherein the total amount of the above-described swellable fluoromica mineral and the total amount of the above-described acid are mixed with a fraction of the monomer corresponding to 30 wt % or less to the total amount of the above-described monomer, followed by addition of the rest of the monomer and polymerization of the monomer.

7. A process for producing the polyamide resin composition of claim 3, which comprises polymerizing a monomer forming 100 parts by weight of polyamide resin after mixing with 0.1~10 parts by weight of a swellable fluoromica mineral of the above-described property ② having a cation exchange capacity of 50~200 meq/100 g and an acid (pKa 0~6 or negative in 25° C. water) in an amount of 3 times or less moles per the total cation exchange capacity of the above-described swellable fluoromica mineral.

8. A process for producing the polyamide resin composition of claim 4, which comprises polymerizing a monomer forming 100 parts by weight of polyamide resin after mixing with 0.1~10 parts by weight of a swellable fluoromica mineral of the above-described property ② having a cation exchange capacity of 50~200 meq/100 g and an acid (pKa 0~6 or negative in 25° C. water) in an amount of 3 times or less moles per the total cation exchange capacity of the above-described swellable fluoromica mineral.

9. A process for producing the polyamide resin composition of claim 3, which comprises polymerizing a monomer forming 100 parts by weight of polyamide resin after mixing with 0.1~10 parts by weight of an organically treated swellable fluoromica mineral which is prepared by a process comprising (i) mixing a swellable fluoromica mineral of the above-described property ② having a cation exchange capacity of 50~200 meq/100 g, an acid (pKa 0~6 or negative in 25° C. water) in an amount of 3 times or less moles per the total cation exchange capacity of the above-described swellable fluoromica mineral, and a compound forming an organic cation by reacting with the above-described acid in the presence of water, and (ii) treating at 60° C. or higher.

10. A process for producing the polyamide resin composition of claim 4, which comprises polymerizing a monomer forming 100 parts by weight of polyamide resin after mixing with 0.1~10 parts by weight of an organically treated swellable fluoromica mineral which is prepared by a process comprising (i) mixing a swellable fluoromica mineral of the above-described property ② having a cation exchange capacity of 50~200 meq/100 g, an acid (pKa 0~6 or negative in 25° C. water) in an amount of 3 times or less moles per the total cation exchange capacity of the above-described swellable fluoromica mineral, and a compound forming an organic cation by reacting with the above-described acid in the presence of water, and (ii) treating at 60° C. or higher.

* * * * *